United States Patent
Moser et al.

[15] 3,687,023
[45] Aug. 29, 1972

[54] COMPACTOR WHEEL CONFIGURATION

[72] Inventors: Raymond L. Moser, Tremont; Dorrance Oldenburg, Peoria; Donald E. Sunderlin, Washington, all of Ill.

[73] Assignee: Caterpillar Tractor Co., Peoria, Ill.

[22] Filed: March 16, 1970

[21] Appl. No.: 19,871

[52] U.S. Cl. .................... 94/50, 172/52, 301/43
[51] Int. Cl. .................................... E01c 19/26
[58] Field of Search ...... 172/116, 52; 301/41, 47, 52; 180/20

[56] References Cited

UNITED STATES PATENTS

| | | | |
|---|---|---|---|
| 1,077,878 | 11/1913 | Hagan | 172/52 X |
| 1,122,481 | 12/1914 | Cowart | 172/52 X |
| 2,318,550 | 5/1943 | Wittman | 301/43 X |
| 3,403,745 | 10/1968 | Commons | 180/20 X |
| 3,435,873 | 4/1969 | Weier | 301/43 X |

*Primary Examiner*—Jacob L. Nackenoff
*Attorney*—Fryer, Tjensvold, Feix, Phillips and Lempio

[57] ABSTRACT

A compactor vehicle is provided having a plurality of wheels in the form of drums having chopper blades attached thereto in an offset chevron pattern. The offset chevron pattern faces forwardly on the front wheels and rearwardly on the rear wheels thereby providing improved chopping and flattening action when the vehicle is used to prepare land for replanting in forest management or to compact layers or debris and soil when used in sanitary landfill operations. Extension wheels having chopper blades are additionally provided whereby the vehicle may operate satisfactorily under soft soil conditions.

6 Claims, 3 Drawing Figures

Patented Aug. 29, 1972
3,687,023
2 Sheets-Sheet 1
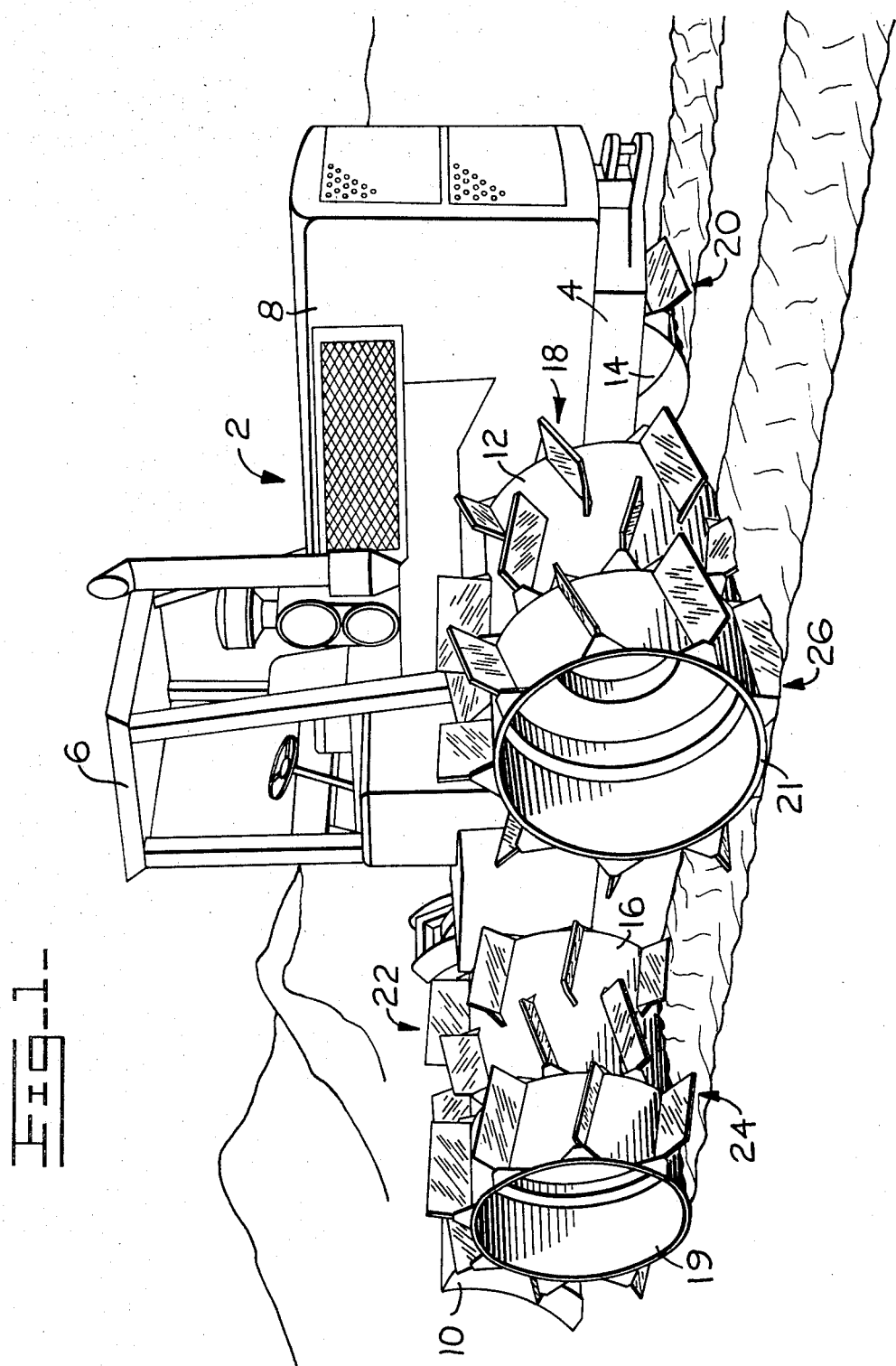
Fig_1.
INVENTORS
RAYMOND L. MOSER
DORRANCE OLDENBURG
DONALD E. SUNDERLIN
BY
ATTORNEYS

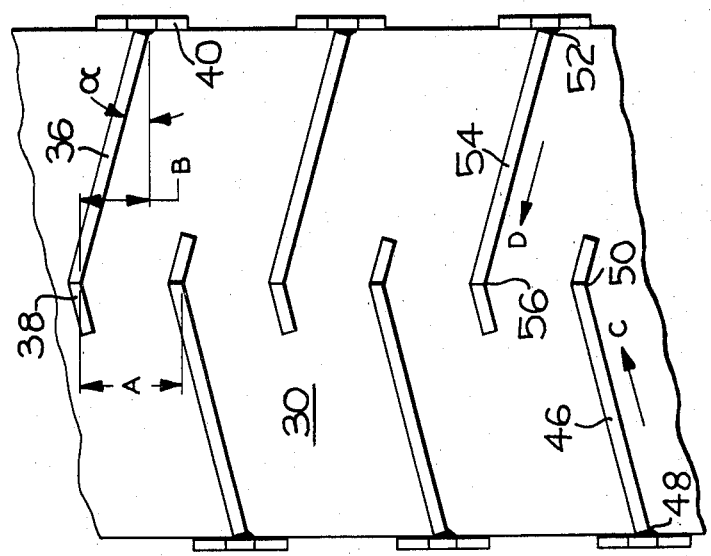
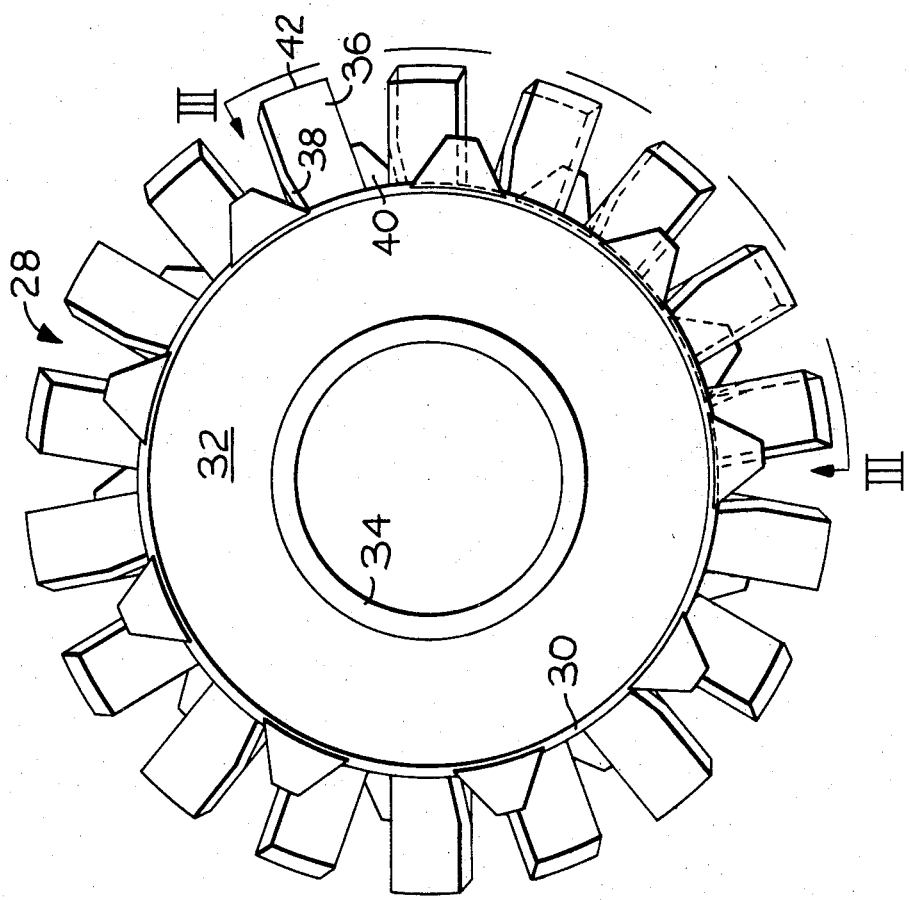
INVENTORS
RAYMOND L. MOSER
DORRANCE OLDENBURG
DONALD E. SUNDERLIN
ATTORNEYS

COMPACTOR WHEEL CONFIGURATION

BACKGROUND AND SUMMARY OF THE INVENTION

This invention relates to a compactor vehicle and more particularly to a wheel configuration therefor in the form of a drum having chopper blades attached thereto in an offset chevron pattern. The offset chevron pattern faces forwardly on the front wheels and rearwardly on the rear wheels thereby providing a reverse pattern between front and rear which improves the chopping or flattening action of the invention over device currently known.

Compactor vehicles are frequently used in the pulpwood industry wherein a method of forest management has been developed that involves harvesting all trees on a given tract and then preparing the land for replanting. The process of preparing for replanting is called site preparation.

Currently, site preparation consists of towing drum-type choppers with track-type tractors equipped with bulldozers over the site to be prepared. The bulldozers function to both knock down trees and brush as well as to cut them into small pieces by means of the towed, drum-type choppers. The choppers must operate to cut the felled trees into pieces small enough such that they will not interfere with the planting machines that follow. The chopper blades further function to penetrate and loosen the soil and crush tree roots such that the new seedlings are able to get a good start. With the present bulldozer-chopper system, more than one pass is usually necessary to achieve satisfactory site preparation. Thus, the number of acres that may be prepared in a given time period is unduly limited.

Compactor vehicles are also frequently used in sanitary landfill operations wherein pits or low areas are alternately filled in with layers of debris and soil. Each layer must be compacted to a maximum density in order to conserve valuable land space. The problem encountered to date has been to completely cut up, crush and compact the debris to obtain the desired maximum density. Currently used in sanitary landfill operations are sheep's foot rollers which are either towed behind a bulldozer or are on an external part of a self-propelled vehicle. These sheep's foot rollers are not a completely satisfactory solution to the sanitary landfill problem since they have a tendency to clog. While other types of vehicle wheels for compacting in sanitary landfill operations have been suggested, e.g., that shown in U.S. Pat. No. 3,463,063, such designs do not achieve the depth of soil penetration necessary for both the sanitary landfill and forestry site preparation operations.

It is, therefore, an object of the present invention to provide a compactor vehicle having a plurality of wheels with a plurality of chopper blades mounted thereon which may be used for both forestry site preparation and sanitary landfill operations.

It is a further object of this invention to provide a compactor vehicle having a plurality of ground-engaging wheels with a plurality of chopper blades mounted thereon in an offset chevron pattern wherein the pattern of the front wheels is the reverse of the pattern of the rear wheels to facilitate the crushing of landfill materials, the chopping of brush and small trees, and the loosening of soil.

It is a further object of this invention to provide a compactor vehicle having a plurality of compaction wheels which may be effectively extended by the addition of wheel extensions to facilitate compactor vehicle use under soft soil conditions.

It is a further object of this invention to provide a compaction wheel having a plurality of chopper blades arranged in a chevron pattern around the periphery thereof, said pattern providing self-cleaning ability due to the fact that such pattern eliminates corner pockets where debris has a tendency to collect.

It is a further object of this invention to provide a compaction wheel having a plurality of chopper blades arranged around the periphery thereof, said blade being of sufficient length to produce penetration sufficient to chop tree roots and loosen soil when used in forestry site preparation, as well as to facilitate crushing of debris in sanitary landfill operations.

It is a further object of this invention to provide a compaction wheel having a plurality of chopper blades arranged around the periphery thereof in an offset chevron pattern at an angle and spacing of the blades such that at any given time the vehicle weight acts substantially at a point on a chevron half to produce high unit loading for compaction purposes.

It is a still further object of this invention to provide a compaction wheel having a plurality of chopper blades arranged around the periphery thereof, said chopper blades being arranged in an offset chevron pattern, the angle and spacing thereof being such that even weight transfer from one blade to the next is produced and thus to facilitate smooth vehicle ride.

Further and more specific objects and advantages of the present invention and the manner in which it is carried into practice are made apparent in the following specification wherein the invention is described in detail by reference to the accompanying drawings.

BRIEF DESCRIPTION OF THE DRAWINGS

FIG. 1 is a perspective view of the vehicle of this invention illustrating a plurality of compaction wheels and wheel extensions mounted thereon;

FIG. 2 is a side view of a single compaction wheel of this invention illustrating the orientation of chopper blades mounted around the periphery thereof;

FIG. 3 is a partial peripheral view of the compaction wheel of FIG. 2 illustrating the offset chevron pattern of the chopper blades as well as the means used in mounting said blades.

DETAILED DESCRIPTION

Referring now to FIG. 1, there is shown a self-propelled vehicle 2 of conventional construction. The vehicle comprises generally a frame member 4, to which are attached an operator cab 6 and a means of propulsion shown generally at 8 such as an internal combustion engine. The vehicle may also conventionally have a bulldozer blade 10 mounted at the front end of the frame.

Supporting the vehicle for motive propulsion are a plurality of ground-engaging wheels comprising a pair of rear wheels 12, 14 and a pair of front wheels, one of which is shown at 16. Optionally mounted on each of the wheels is an extension wheel, two of which are shown at 19 and 21. Mounted on each of the wheels are a plurality of chopper blades generally shown at 18, 20, and 22. These chopper blades are oriented in an offset chevron pattern with the direction of the blades on a front wheel, e.g., blades 22 on wheel 16, being oriented in reverse direction to the orientation of the blades on the rear wheel, e.g., blades 18 on wheel 12.

The wheel extensions similarly have a plurality of chopper blades mounted around the periphery thereof and are oriented such that the direction of the blades on a front extension, e.g., blades 24 on wheel 19, are the reverse of the direction of orientation of the blades on a rear extension, e.g., blades 26 on wheel extension 21. The extensions are of a diameter equal to that of the wheels and are removably attached to the wheels by conventional means (not shown).

Referring now to FIG. 2, there is shown generally a side elevation view of a single compaction wheel 28. The compaction wheel defines a hollow cylinder or drum 30 having end walls in the form of a pair of web members, one of which is shown at 32 fixed to each end thereof. An attachment ring 34 is further provided around a hole in the web for the purpose of facilitating attachment to a vehicle axle by conventional attachment means (not shown).

Fixedly mounted around the outer periphery of the cylinder, are a plurality of identical chopper blades oriented in an offset chevron pattern. By offset chevron pattern is meant the pattern that is achieved by nesting a plurality of V-shapes and eliminating alternate arms of succeeding V-shapes and then separating or offsetting the V-shapes. Each chopper blade may thus be defined as a V-half or chevron half.

An individual chopper blade or V-half comprises essentially a rectangularly shaped metal plate having dimensions of height, length and thickness. Each chopper blade, for example, chopper blade 36, is fixedly mounted to the outer periphey of the cylinder at an angular orientation to the cylinder axis and in a generally radially outwardly extending direction from said axis. A small right triangularly shaped inner gusset 38 is fixedly attached to the inner end of said chopper blade for purposes of rigidity. Similarly, a trapezoid shaped outer gusset 40 is fixedly attached to the opposite end of said blade 36 and the cylinder end. Blade 36 further has a sharpened edge 42 along its free length edge, to facilitate cutting and chopping.

Referring now to FIG. 3 there is shown a peripheral view taken in direction 3—3 on FIG. 2. A typical, radially outwardly extending chopper blade 36 is shown to be offset at an angle alpha to the cylinder axis. The chopper blade extends from a cylinder edge where it is in contact with outer gusset 40 to a point about halfway along the cylinder length, where it contacts inner gusset 38. Outer gusset 40 is oriented flush with the cylinder edge while inner gusset 38 is conveniently oriented to parallel the adjacent chevron half.

Alternate or succeeding chopper blades are spaced a circumferential distance A from each other around the periphey of the cylinder, said distance being equal to the circumferential distance around the cylinder divided by the number of chopper blades. The spacing A should be such that there is a smooth transfer of loading from one ground contacting chopper blade to the next succeeding blade when the wheel is in motion.

Theoretically perfect load transfer would occur from blade to blade when an angle of the blades is such in relation to a circumferential distance that the peripheral distance B occupied by a given blade is equal to the distance A. In practice, distance B may be somewhat less than or different from distance A due to a number of factors including the fact that the blades will sink into the supporting ground and thus vary from the theoretically perfect model which assumes a flat, rigid supporting surface.

The particular offset chevron pattern thus described produces both an even transfer of weight from one blade to the next and therefore a satisfactory ride for the vehicle as well as producing a high unit loading of the chopper blades. Such high unit loading is desirable to maximize crushing and cutting ability of the blades.

An explanation of what is meant by high unit loading is as follows. As a given blade 46 contacts the ground, the contact will begin at point 48 which is the point on the blade foremost in the direction of travel. As the wheel rotates the weight on the wheel will move along the blade in the direction C until it reaches point 50 on blade 46. At this point the weight will be transferred to point 52 on blade 54. The weight will similarly be transferred along blade 54 in direction D until point 56 is achieved. In similar manner, weight transfer will occur on succeeding chevron halves as the wheel rotates. Thus, the weight is picked up by each succeeding blade creating high unit pressure since the weight at any one time acts substantially on a point of the blade which is in contact with the ground. Of course, if the direction of wheel rotation is reversed the weight loading along the blade edges will similarly be reversed. That is to say directions C and D would be reversed from that shown in FIG. 3.

It is understood that the foregoing description is merely illustrative of a preferred embodiment of the invention and that the scope of the invention is not to be limited thereto, but is to be determined by the scope of the appended claims.

What is claimed is:

1. A self-propelled compactor vehicle comprising a frame with at least one front ground-engaging wheel and at least on rear ground-engaging wheel mounted for rotation on said vehicle adjacent the front and rear ends thereof, respectively, said wheels comprising metal cylindrical members each defining an axis of rotation and a diameter and having mounted around the periphery thereof a plurality of metal chopper blades, said blades being oriented at an angle to said cylinder axis and extending only part way across said cylinders from points adjacent a cylinder end, successive blades being oriented alternately from opposite cylinder ends to define chevron halves in an offset chevron pattern, each of said chopper blades being in the form of a rectangularly shaped metal plate having dimensions of height, length, and thickness, said height being greater than said thickness, each of said chopper blades being secured to its supporting wheel periphery along a length edge so that said chopper blade extends radially outwardly from said wheel, the height dimension of each radially extending chopper blade being substantial with respect to the wheel diameter and having means producing a cutting edge on a free length edge so as to insure penetration sufficient to chop tree roots, loosen soil, and crush debris, succeeding chopper blades being circumferentially spaced from each other about the supporting wheel periphery a circumferential distance or spacing A which is equal to the circumferential distance around the cylinder divided by the number of chopper blades, the angular orientation of said chopper blades defining a distance B which is the circumferential distance around the cylinder occupied by a given blade, and wherein distance B is selected to be no greater than distance A whereby a portion of at least one chevron half of each wheel is in position to contact the ground during rotation and thereby insure smoothness of operation, said wheel further including an inner gusset associated with each chopper blade fixedly attaching the inner end of said chopper blade to the peripheral cylinder surface intermediate the ends of the cylinder, and further including an outer gusset associated with each chopper blade fixedly attaching the outer end of said chopper blade to the cylinder end.

2. The vehicle of claim 1 wherein said outer gusset is trapezoidal in shape.

3. The vehicle of claim 1 wherein said inner gusset is a plate member and is oriented in spaced, parallel relation with both the next preceeding and next succeeding chopper blades.

4. The vehicle of claim 3 wherein each inner gusset is triangular in shape.

5. The vehicle of claim 1 wherein distance B is selected to be less than distance A.

6. The vehicle of claim 1, wherein the cylindrical members and chopper blades are of metal material.

* * * * *

UNITED STATES PATENT OFFICE
CERTIFICATE OF CORRECTION

Patent No. 3,687,023　　　　　Dated August 29, 1972

Inventor(s) RAYMOND L. MOSER, ET. AL.

It is certified that error appears in the above-identified patent and that said Letters Patent are hereby corrected as shown below:

In the Abstract, line 8, "or", second occurrence, should read -- of -- . Column 4, line 44, claim 1, "on" should read -- one -- .

Signed and sealed this 22nd day of January 1974.

(SEAL)
Attest:

EDWARD M. FLETCHER, JR.　　　　RENE D. TEGTMEYER
Attesting Officer　　　　　　　　Acting Commissioner of Patents